United States Patent

[11] 3,604,860

[72] Inventor Robert F. Buchheit
Reynoldsburg, Ohio
[21] Appl. No. 889,254
[22] Filed Dec. 30, 1969
[45] Patented Sept. 14, 1971
[73] Assignee Bell Telephone Laboratories, Incorporated
Berkeley Heights, N.J.

[54] CHANGE OF STATE DETECTOR
10 Claims, 4 Drawing Figs.

[52] U.S. Cl. 179/175.2 C, 340/166 R
[51] Int. Cl. H04m 3/24
[50] Field of Search 179/175.2 C, 175.21, 175.23, 175.2 R; 340/166 R; 324/28

[56] References Cited
UNITED STATES PATENTS
3,348,075 10/1967 Wagar .......................... 324/28

*Primary Examiner*—Kathleen H. Claffy
*Assistant Examiner*—Douglas W. Olms
*Attorneys*—R. J. Guenther and James Warren Falk

ABSTRACT: An arrangement for identifying the change of state of any one of a group of switching devices includes first and second groups of intersecting conductors. Each conductor is connected through a signal detector to an energy source. Switching means associated with each one of the devices momentarily connects a distinct pair of intersecting conductors whereby a distinct pair of detectors identifying a switching device is activated.

INVENTOR
R.F. BUCHHEIT
BY
ATTORNEY

CHANGE OF STATE DETECTOR

BACKGROUND OF THE INVENTION

My invention is related to switching systems and more particularly to checking circuitry in telephone switching equipment.

In switching systems employing large numbers of switching devices such as relays, it is often desirable to identify the state of selected devices to check on the proper operation of the system. It is particularly desirable to identify the states of devices connecting the switching control to external facilities. Since such devices are not utilized in the internal operation of the system, their response is generally not detectable without special arrangements. Such checking arrangements are very useful in switching systems wherein electronic processing is incorporated because a device state check can be performed at relatively high speeds.

Where such electronic data processing equipment is used together with output relays, a buffer arrangement is often employed. The buffer is adapted to receive and store high-speed signals and to transmit the stored signals to slow operating relays. One buffer arrangement known in the art includes control apparatus and a store. The control receives the signaling data, addresses particular portions of the store, translates the received data and transmits the translated data to the store. The store in turn couples long duration control signals to the output relays associated therewith.

Checking that the appropriate switching device is operated may be done by interrogating the state of the operated switch and returning a signal indicative of said state to a control device such as the aforementioned controller. Priorly known arrangements of this type require that a special circuit be associated with each switching device and that an interrogating circuit be added to appropriately detect the device state and couple the return signal for checking during a predetermined time interval. Where large numbers of switches such as relays are employed, this checking equipment becomes complex and expensive. The complexity and expense of such checking equipment may be reduced if only the change of state of the devices to be checked is detected.

BRIEF SUMMARY OF THE INVENTION

My invention is an arrangement for identifying the change of state of any distinct one of a group of switching devices. The arrangement includes a plurality of groups of conductors. Each conductor of one group is terminated in a signal detector. All of the detectors associated with a group are commonly connected to an energy source. Means associated with each switching device are connected between a pair of conductors, including a conductor from each of two groups, to momentarily complete the path between said conductors in the pair during the change of state of the associated switching device. In this way a distinct pair of signal detectors is rendered operative during the change of state of a particular switching device.

According to one aspect of my invention, first and second groups of conductors are arranged in a matrix pattern. A switch associated with each switching device is placed between two intersecting conductors in a preassigned manner and each conductor is terminated in a signal detector. The signal detectors of one group are commonly connected to an energy source while the signal detectors of the other group are commonly connected to an energy sink. Upon the change of state of a switching device, the associated matrix switch provides a momentary path between the detectors connected to the preassigned intersecting conductors. The detectors are rendered operative whereby the identity of the switching device changing state is determined. In this way any change of state is identified by a common set of detectors without the use of special interrogation circuitry.

In an illustrative embodiment of my invention, an element of a memory matrix is addressed by a signal controller in response to signaling data received by the controller. The addressed element provides an output which is coupled to one of a plurality of relays to change the state of said relay. Each relay has associated with it a make-before-break contact arrangement operative to momentarily close upon the change of state of said relay. The contact arrangement is connected between preassigned conductors of a conductor matrix. Each conductor of every group in the matrix is connected to a signal detector and the signal detectors of the group are commonly connected to an energy source. The momentary closing of a particular contact arrangement renders a unique pair of detectors operative. Signals from said detector pair are transmitted to the controller wherein the identity of the switching device changing state is compared to the addressed switching device. In this way the response of the addressed relay is checked against the originating signal data.

DETAILED DESCRIPTION

Figure 1:
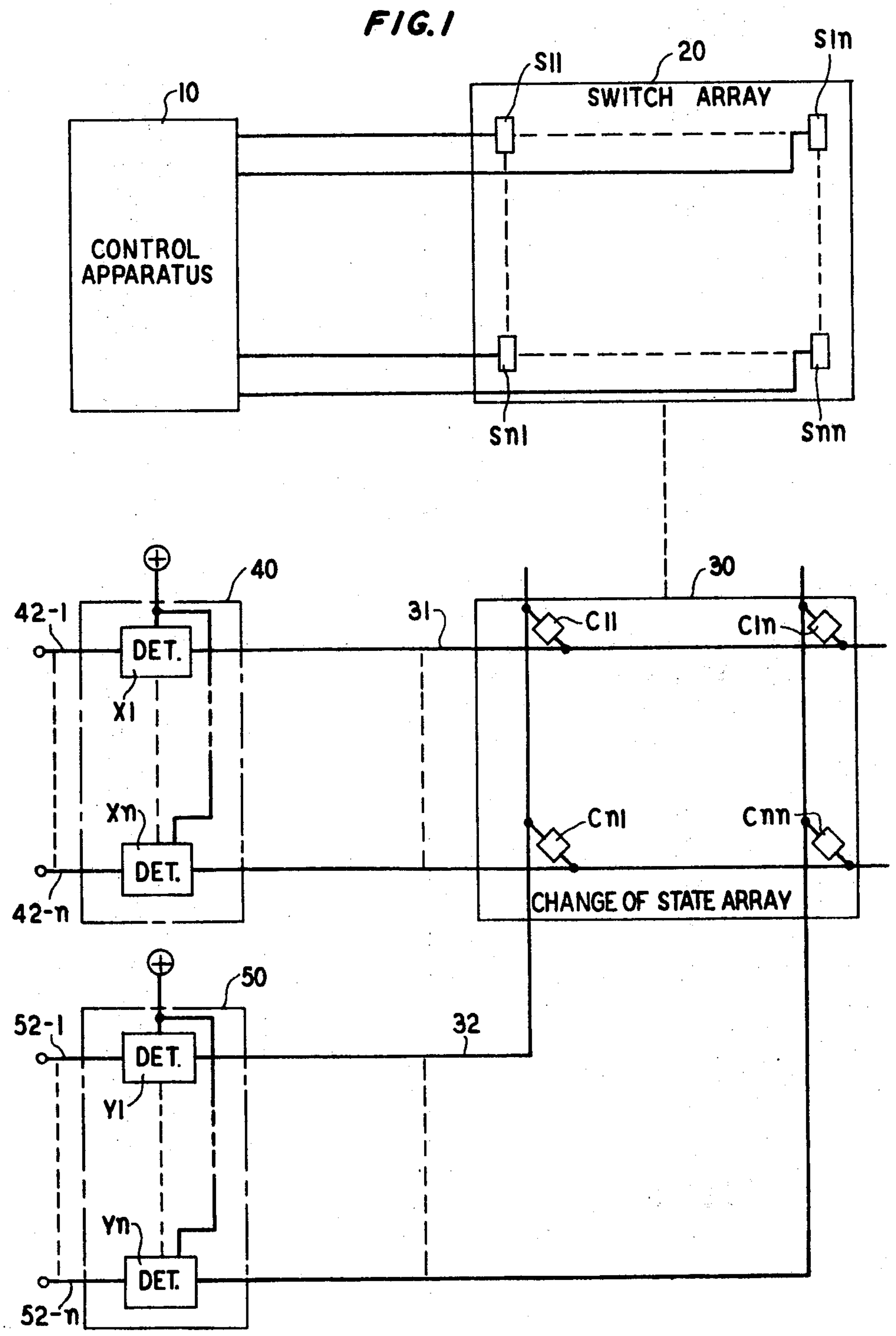
FIG. 1 depicts a general schematic diagram of an embodiment of my invention.

Switch array 20 on FIG. 1 comprises a plurality of switching devices which are controlled by control apparatus 10. The switching devices are shown in a rectangular array for convenience but it is to be understood that any type of array may be used with my invention. Each switch, such as switch S11, is controlled by a separate line from apparatus 10. In order to determine whether a switch from array 20 is changing state, change of state array 30 is used. Array 30 comprises two groups of intersecting conductors. At each intersection point in the array, a switching device such as C11 is connected between the intersecting conductors. Device C11 is operative to momentarily provide a complete path between the intersecting conductors when switch S11 changes state. In like manner device C*n*1 is associated with switch S*n*1, device C1*n* is associated with switch S1*n*, and device C*nn* is associated with switch S*nn*.

One terminal of device C11 is connected via lead 31 to detector X1, and the other terminal of device C11 is connected to detector Y1 via lead 32. Detectors X1 and Y1 are rendered operative when a signal path is connected therebetween through device C11. When this signal path is completed, a first output signal is obtained from detector X1 on terminal 42–1 and a second output signal is obtained from detector Y1 on terminal 52–1. These two signals uniquely determine that switch S11 has changed state. Terminals 42–1 and 52–1 may be further connected so that the change of state of switch S11 can be compared to the desired operation ordered by control apparatus 10. Thus if there are $n^2$ switches in array 20, only $2n$ detectors are required to identify the change of state of any one of switches S11 through S*nn*.

The detection of the present state of any one of switches S11 through S*nn* requires that a state detector be associated with each switch and that some interrogating means be provided to couple the output of these detectors for checking purposes. Thus $n^2$ detectors, additional interrogating circuitry, and timing circuits are required. The use of the change of state detectors as illustrated in FIG. 1 provides a substantial decrease in the complexity of the device state-checking equipment.

Figure 2:
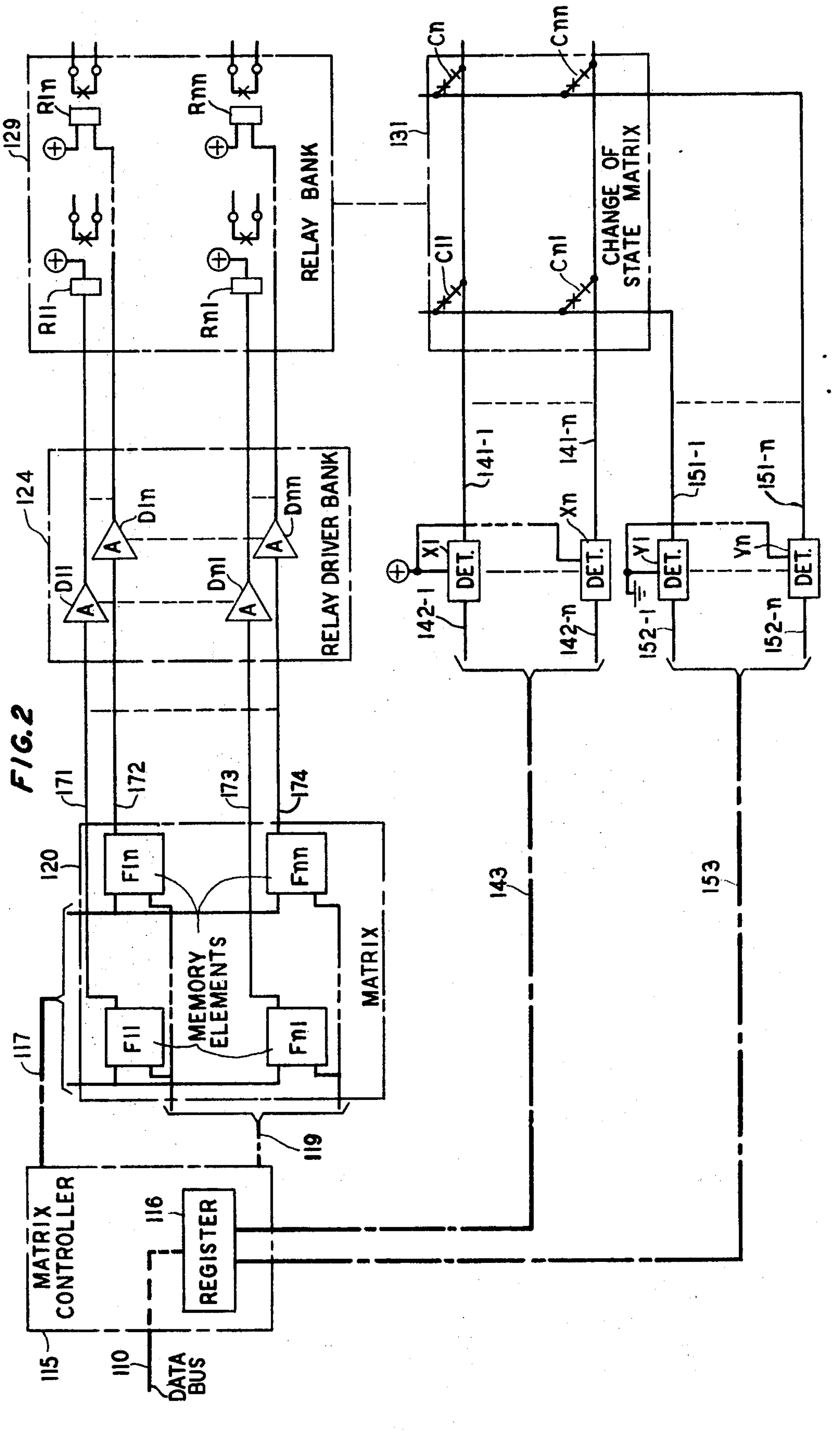
FIG. 2 depicts an embodiment of my invention useful in conjunction with electronic switching arrangements.

FIG. 2 illustrates an embodiment of my invention which can be employed in an electronic switching system. In FIG. 2 a memory matrix 120 is used to store relay control information received via data bus 110 through matrix controller 115. These signals originate in processing equipment connected to bus 110 but not shown. Matrix controller 115 is used to address memory matrix 120 and to control the state of the addressed element in matrix 120. The addressed element, e.g., F11, can then control the state of the relay associated, e.g., R11, in relay bank 129. The matrix controller applies a signal through cable 119 to address one horizontal line of memory elements in array 120. A signal is also applied via cable 117 to address one vertical line of array 120 memory elements and to provide the appropriate relay control information.

Figure 4:
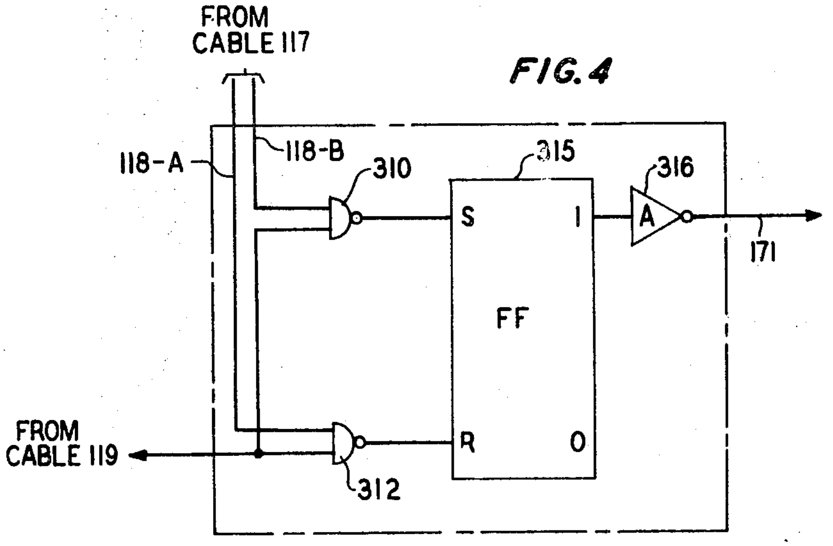
FIG. 4 shows a memory element in matrix 120 of FIG. 2 in greater detail.

FIG. 4 shows an individual memory element of matrix 120. For purposes of illustration, assume the memory element is element F11. This memory element, when addressed, receives an enabling signal from cable 119 which alerts both gates 310 and 312. The signal from cable 117 is applied to one of leads 118–1A and 118–1B so that one of gates 310 and 312 is opened. Gates 310 and 312 control the state of flip-flop 315. The enabling of gate 310 causes flip-flop 315 to set while the enabling of gate 312 causes flip-flop 315 to reset. Since the flip-flops in the memory matrix respond very rapidly to an input signal from controller 110, flip-flop 315 operates to store high-speed signals from controller 115 that will control the state of an associated relay in relay bank 129. Thus, when flip-flop 315 is set, a signal is applied to one driver of relay driver bank 124 which then controls the state of the associated relay in bank 129. The setting of memory element F11 provides an output signal through amplifier 316 to lead 171 which is coupled to relay R11 via driver D11 to operate relay R11. The resetting of F11 causes relay R11 to release. In like manner, the other memory elements of matrix 120 control the operation of their associated relays in relay bank 129.

Relay bank 129 is generally used to make connections to external facilities such as trunks and need not be interconnected with matrix controller 115. Thus there is no positive check on whether a particular relay has responded correctly to commands from the controller. In order to provide a positive check on the relay operation, change of state matrix 131 is employed. The matrix comprises a group of X-oriented conductors and a group of Y-oriented conductors. Each conductor of one group intersects all the conductors of the other group but does not make connections thereto. At each intersection in matrix 131 a make-before-break contact arrangement is connected between the intersecting conductors. As is well known in the art such a contact arrangement provides a momentary path when the controlling relay coil changes state. In this matrix arrangement, each make-before-break contact is part of the contact set of an associated relay of bank 129. For example, a momentary path is provided through contact C11 only when relay R11 changes state.

Each X-oriented conductor of the matrix is connected to one of detectors X1 through X*n* and each Y-oriented conductor is connected to one of detectors Y1 through Y*n*. The momentary operation of a contact in matrix 131 completes the path between a predetermined pair of detectors. For example, make-before-break contact C11 provides a momentary path between detector X1 and detector Y1 via leads 141–1 and 151–1. The outputs of detectors X1 and Y1 are applied to leads 142–1 and 152–1, respectively, so that the momentary path through contact C11 causes output signals on leads 142–1 and 152–1 of cables 143 and 153, respectively. These output signals are returned to matrix controller 115 to indicate that relay R11 has changed state. This information may be interpreted in controller 115, as is well known in the art, so that a positive check can be made on the change of state of the relays of bank 129 in response to the signals from data bus 110. Controller 115 may, for example, contain a register 116 which stores the address of a memory element received from data bus 110 and compares said stored address to an address derived from the signals on cables 143 and 153.

Figure 3:
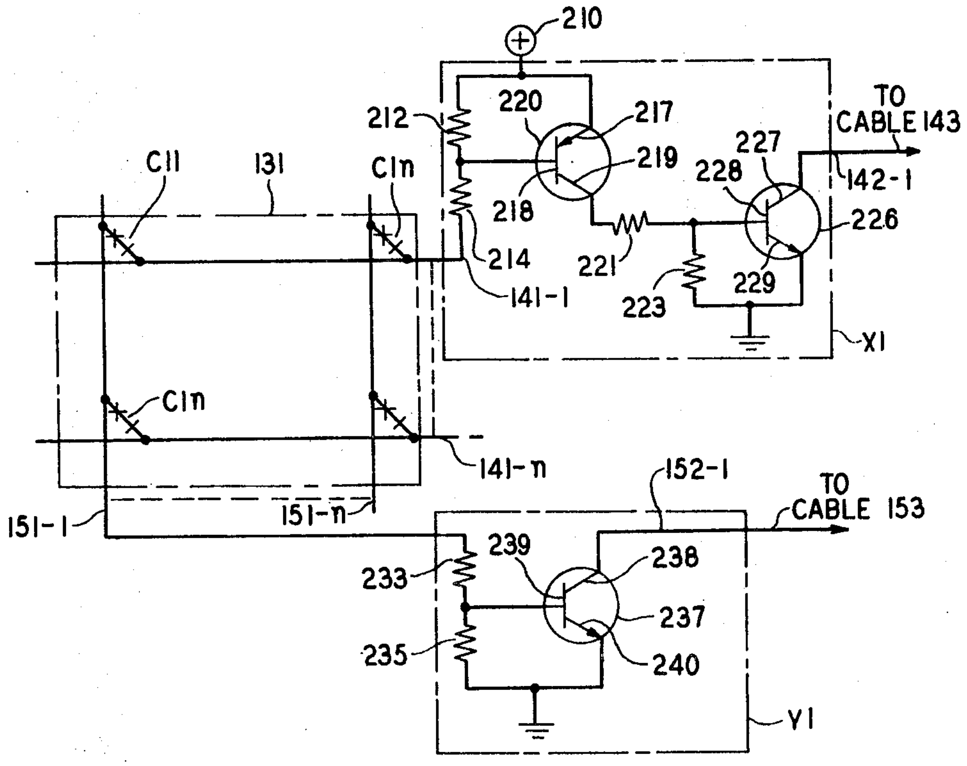
FIG. 3 shows the detector circuits of FIG. 2 in greater detail.

FIG. 3 shows detectors X1 and Y1 in greater detail. Detector X1, as well as all other X detectors, is serviced by positive voltage source 210 which source is connected to lead 141–1 via resistors 212 and 214 of detector X1. Lead 141–1 is, in turn, connected to an X-oriented conductor of matrix 131 and this X conductor is connectable to all Y-oriented conductors via contact sets C11 through C1*n* as indicated in FIG. 3. The first Y-oriented conductor of matrix 131 is connected via lead 151 and resistors 233 and 235 in detector Y1 to ground.

Upon a change of state of relay R11, the make-before-break arrangement of contact set C11 completes the path from positive source 210 in detector X1 to ground potential in detector Y1 via resistors 212, 214, leads 141–1 and 151–1, and resistors 233 and 235. It is to be understood that the other X detectors and the other Y detectors operate in similar fashion so that the change of state of a distinct one of the relays in bank 129 operates a contact in matrix 131 to provide a unique path through a distinct X detector and a distinct Y detector.

Positive source 210 is also connected to emitter 217, and base 218 of transistor 220 is connected to the junction between resistors 212 and 214. The momentary closure of contact set C11 causes current to flow through resistor 212 so that the voltage on base 218 is lowered. This causes transistor 220 to conduct. Current then flows from emitter 217 through the emitter collector path of transistor 220, collector 219, resistor 221 and resistor 223. The current through resistor 223 raises the potential of base 228 of transistor 226 with respect to emitter 229. Transistor 226 conducts and the collector emitter path of this transistor switches from a high impedance state to a low impedance state. In this way, a current path is established in lead 142–1 of cable 143 so that the low impedance state of transistor 226 may be detected in matrix controller 115. Transistor 220 functions as a voltage translator whereby the output on lead 142–1 can be referred to ground via transistor 226 without restricting the voltage of positive source 210.

The current flowing through resistor 235 in detector Y1 during the momentary closure of contact arrangement C11 raises the base potential of base 239 so that it is more positive than emitter 240. In this way, transistor 237 is rendered conductive. The collector-emitter path of transistor 237 then switches from a high impedance state to a low impedance state and current may flow in lead 152–1 of scale 153. The low impedance of transistor 237 now can be detected in register 116 of matrix controller 115.

The momentary path completion via contact set C11 in response to a change of state of relay R11 uniquely renders detector X1 and detector Y1 operative. The output signals from these two detectors are then applied to matrix controller 115 to identify the change of state of relay R11. As is well known in the art, the signals from detectors X1 and Y1 may be registered in register 116 of controller 115 and compared to the originating signal from data bus 110 to provide a positive check on the response of selected relay R11 to the originating control signal from data bus 110. In this way the change of state of any distinct one of the relays in relay bank 129 may be identified and compared to the control signal enabling said change of state. After the change of state of relay R11, contact set C11 opens the path between detectors X1 and Y1. These detectors are now available to operate in response to the change of state of other relays of bank 129.

If two or more relays having a common X coordinate change states, the two changes of states are individually identified since two Y detectors are rendered operative. In this event, there are no restrictions on the change of state identification by the checking circuit including matrix 131. Where two relays change state simultaneously, the separate identification of the relays is not possible. But, as is known in the art, the output signals on cables 143 and 153 can be utilized in register 116 to provide a partial verification of the response of relay bank 129 to data from bus 110.

What is claimed is:

1. In a switching system having a plurality of switching devices, a circuit for identifying a change of state of any distinct one of said devices comprising a plurality of groups of conductors, means associated with each switching device responsive to a change of state of said associated device for momentarily completing the path between a predetermined conductor of one group and a predetermined conductor of another group, and means connected to each conductor for detecting the path completion through said conductor whereby a distinct pair of detecting means is rendered operative during the momentary completion of said path.

2. In a switching system having a plurality of switching devices, a circuit for identifying a change of state of any distinct one of said devices according to claim 1 wherein said plurality of conductor groups comprises a first and a second group, all of said detecting means connected to the first group of conductors being commonly connected to a first source of potential, all of the detecting means connected to said second group of conductors being commonly connected to a second source of potential, and each detecting means comprises for connecting said associated potential source to said connected conductor and means for detecting current flow from said first and second potential sources via said momentarily completed path.

3. In a switching system having a plurality of switching devices, a circuit for identifying a change of state of any distinct one of said devices according to claim 2 wherein each switching device comprises a relay and each momentary path completing means comprises a contact arrangement responsive to the change of state of said relay.

4. In a switching system having a plurality of switching devices, a circuit for identifying a change of state of any distinct one of said devices according to claim 3 wherein said contact arrangement comprises a series-connected make-before-break contact pair.

5. In a switching system having a plurality of switching devices and means for controlling said switching devices, a circuit for identifying the change of state of any distinct one of said devices comprising a first and second groups of conductors, means assigned to each switching device responsive to a change of state of said assigned switching device connected between a distinct first group conductor and a distinct second group conductor for momentarily establishing a signal path between said distinct first and second group conductors, means connected to each conductor for detecting the completion of a signal path including said conductor, and means responsive to the operation of said detecting means for applying the output of said detecting means to said controlling means.

6. In a switching system having a plurality of switching devices and means for controlling said switching devices, a circuit for identifying the change of state of any one of said devices according to claim 5 wherein said controlling means further comprises means for receiving device control signals, means associated with each switching device for storing said device control signals, and means for selectively applying said stored device control signals to said switching devices.

7. In a switching system having a plurality of switching devices and means for controlling said switching devices, a circuit for identifying the change of state of any one of said devices according to claim 6 wherein said controlling means further comprises means for storing the outputs of said detecting means and for comparing said detecting means outputs to said stored controlling signals.

8. In a telephone switching system having a plurality of trunk-connecting relays and means for controlling said relays, a circuit for identifying the change of state of any distinct one of said relays comprising a group of X-oriented conductors, a group of Y-oriented conductors, contact means associated with each relay connected between a distinct X-oriented conductor and a distinct Y-oriented conductor, said contact means being responsive to the change of state of said associated relay to close the path between said distinct X-oriented and Y-oriented conductors, and a detector connected to each conductor for detecting the closing of a path including said conductor whereby a unique pair of detectors is rendered operative upon the closing of a distinct path.

9. In a telephone switching system having a plurality of trunk-connecting relays and means for controlling said relays, a circuit for identifying the change of state of any distinct one of said relays according to claim 8 wherein each detector connected to an X-oriented conductor comprises a first and second transistors each having an emitter, a base and a collector, said first transistor emitter being connected to a first potential source, means for connecting said first potential source to said connected conductor and to said first transistor base, means for connecting said first transistor collector to said second transistor base, said second transistor emitter being connected to a ground reference potential, and output means connected between said second transistor collector and said controlling means.

10. In a telephone switching system having a plurality of trunk-connecting relays and means for controlling said relays, a circuit for identifying the change of state of any distinct one of said relays according to claim 9 wherein each detector connected to a Y-oriented conductor comprises a third transistor having an emitter, a base and a collector, means for connecting said conductor to said third transistor base, said third transistor emitter being connected to a ground reference potential output means connected between said third transistor collector and said controlling means.